US009286803B2

(12) United States Patent
Tippelhofer et al.

(10) Patent No.: US 9,286,803 B2
(45) Date of Patent: Mar. 15, 2016

(54) DIRECTIONAL PARKING AVAILABILITY VISUALIZATION SYSTEM (71) Applicants: VOLKSWAGEN AG, Wolfsburg (DE); AUDI AG, Ingolstadt (DE)

(72) Inventors: Mario Tippelhofer, Redwood City, CA (US); Marco Antonio Lobato Fregoso, San Francisco, CA (US); Heiko Maiwand, Redwood City, CA (US); Trevor Shannon, Mountain View, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 33 days.

(21) Appl. No.: 14/318,623

(22) Filed: Jun. 28, 2014

(65) Prior Publication Data
US 2015/0379873 A1    Dec. 31, 2015

(51) Int. Cl.
G08G 1/08    (2006.01)
B60Q 1/48    (2006.01)
G08G 1/14    (2006.01)

(52) U.S. Cl.
CPC .................... *G08G 1/143* (2013.01)

(58) Field of Classification Search
None
See application file for complete search history.

(56) References Cited

U.S. PATENT DOCUMENTS

| | | | | |
|---|---|---|---|---|
| 7,519,922 B2* | 4/2009 | Obradovich | ........ | B60R 16/0231 715/771 |
| 7,899,583 B2* | 3/2011 | Mendelson | ............. | G08G 1/14 340/932.2 |
| 8,928,494 B2* | 1/2015 | Aivas | ..................... | G08G 1/144 340/932.2 |
| 9,076,336 B2* | 7/2015 | Tippelhofer | ........... | G08G 1/143 |
| 2008/0136674 A1* | 6/2008 | Jang | ......................... | G08G 1/14 340/932.2 |
| 2011/0015934 A1* | 1/2011 | Rowe | ..................... | G06Q 30/02 705/1.1 |
| 2011/0133959 A1* | 6/2011 | Suzuki | ..................... | G08G 1/14 340/932.2 |
| 2013/0057686 A1* | 3/2013 | Genc | ......................... | B60R 1/00 348/148 |
| 2013/0265174 A1* | 10/2013 | Scofield | ................. | G01C 21/34 340/932.2 |
| 2013/0268187 A1* | 10/2013 | Scofield | ............. | G01C 21/3685 701/400 |
| 2014/0187225 A1* | 7/2014 | Miller | ................. | H04L 12/1818 455/418 |
| 2014/0207540 A1* | 7/2014 | Rowe | ..................... | G06Q 30/02 705/13 |
| 2014/0285361 A1* | 9/2014 | Tippelhofer | ........... | G08G 1/143 340/932.2 |
| 2014/0309924 A1* | 10/2014 | Varoglu | ............... | G01C 21/206 701/410 |
| 2014/0337135 A1* | 11/2014 | Rowe | ..................... | G06Q 30/02 705/14.57 |
| 2014/0350853 A1* | 11/2014 | Proux | ..................... | G01C 21/34 701/533 |
| 2015/0120183 A1* | 4/2015 | Annapureddy | .... | G01C 21/3688 701/430 |
| 2015/0123818 A1* | 5/2015 | Sellschopp | ........ | G01C 21/3484 340/932.2 |
| 2015/0161890 A1* | 6/2015 | Huntzicker | ............ | G08G 1/141 340/932.2 |
| 2015/0168165 A1* | 6/2015 | Suzuki | ............... | G01C 21/3415 701/538 |
| 2015/0187213 A1* | 7/2015 | Amir | .................. | G01C 21/3685 340/932.2 |
| 2015/0215779 A1* | 7/2015 | Fokkelman | ........... | H04W 12/08 726/7 |

FOREIGN PATENT DOCUMENTS

EP    2196961 A1    6/2010

OTHER PUBLICATIONS

ParkMe; downloaded from http://www.parkme.com/; May 8, 2014.
SFPark; downloaded from http://sfpark.org/; May 8, 2014.
Streetline-Find Parking; downloaded from http://www.streetline.com/find-parking/; May 8, 2014.

* cited by examiner

*Primary Examiner* — Julie Lieu
(74) *Attorney, Agent, or Firm* — Barnes & Thornburg LLP (57) ABSTRACT

An in-vehicle system and method for presenting an abstraction of available parking spaces proximate the vehicle, including information conveying the quantity and heading of the available spaces. The available parking information is presented in a format that can be understood at a glance, for use in making navigation decisions while cruising for an available parking space.

32 Claims, 6 Drawing Sheets

DIRECTIONAL PARKING AVAILABILITY VISUALIZATION SYSTEM

FIELD

The present disclosure relates to a system, components, and methodologies for displaying the general direction in which available parking may be found while driving a vehicle. In particular, the present disclosure is directed to a system, components, and methodologies that enable in-vehicle dynamic display of the quantity and direction in which proximate available parking spaces may be found based on the vehicle's location and information of available parking spaces in the vicinity of the vehicle, and dynamically updating the display as the vehicle moves and as updated information of available parking in the vicinity becomes available.

BACKGROUND

Sources of real-time parking information are becoming increasingly available, particularly in large cities. With the help of sensors communicatively coupled to a server backend, it is possible to gain access in near real-time to information of available parking spaces in the vicinity while driving a vehicle. A potentially massive amount of data may be available. For example, there are an estimated 27,000 sensors in the city of San Francisco at present. Other sources of information may also be available to indicate available parking, such as surveillance cameras that provide views of streets, information from parking lot and parking structure management systems which may, for example, track the number of incoming and outgoing cars and estimate therefrom the number of available spaces in the lot or structure, and the like.

SUMMARY

According to the present disclosure, a system is provided that presents, on a display, an abstracted visualization representing a dynamically changing amount of available parking spaces in close proximity to a vehicle while driving, and in what direction the amount of available parking spaces may be found relative to the dynamically changing position and orientation of the vehicle. This is particularly useful when the driver is simply looking for a parking spot nearby, and not a specific destination.

In illustrative embodiments, an in-vehicle available parking presentation system comprises a processor communicatively coupled to a graphical display device, a transceiver that communicates with one or more sources of available parking information, a Global Positioning System (GPS) module, and a data storage device with a database that stores parking information obtained from the transceiver. The system may obtain the location of the vehicle from the GPS module, determine an orientation of the vehicle in any convenient manner, and identify available parking spaces proximate the vehicle based on the vehicle location. The system may determine an estimated distance and heading to each of the identified parking spaces, abstracts the distance and heading information into a graphical format that is easy for the driver to understand at a glance, and presents the abstracted graphical information on a display device. The displayed information may be dynamically updated based on the dynamically changing position and orientation of the vehicle while driving, and updated information of available parking spaces proximate the vehicle as it travels.

In illustrative embodiments, a method of presenting to a driver of a vehicle information of available parking spaces proximate the vehicle may include obtaining a position of the vehicle from a GPS module of the vehicle, determining an orientation of the vehicle, identifying available parking spaces proximate the vehicle based on parking space information received via a transceiver and storing the information in a data storage device. The distance and heading to each of the proximate available parking spaces may be determined, and an abstracted graphical representation of the available parking spaces may be generated that conveys their quantity, distance, and heading in a manner that is simple to understand at a glance, and is presented on a display for use while driving to find parking.

Additional features of the disclosed apparatus, systems, and methods will become apparent to those skilled in the art upon consideration of illustrative embodiments, including the best mode of carrying out the disclosure as presently perceived.

BRIEF DESCRIPTION OF THE FIGURES

The detailed description makes reference to the accompanying figures in which.

DETAILED DESCRIPTION

The figures and descriptions provided herein may have been simplified to illustrate aspects that are relevant for a clear understanding of the herein described devices, systems, and methods, while eliminating for the purpose of clarity other aspects that may be found in typical devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. The present disclosure is deemed to inherently include all such elements, variations, and modifications to the described aspects that would be known to those of ordinary skill in the art.

As discussed above, sources of real-time parking information are becoming increasingly available, and it is possible to gain access in near real-time to information of available parking spaces in the vicinity while driving a vehicle. Sources of information may also include surveillance cameras that provide views of streets, information from parking lot and parking structure management systems which may, for example, track the number of incoming and outgoing cars and estimate therefrom the number of available spaces in the lot or structure, and the like. It is desirable to present this data to the driver in a manner that can provide directional guidance while driving, particularly at street intersections and the like where decisions may be made regarding which way to go, and in a format that demands as little of the driver's attention as possible.

Figure 1:
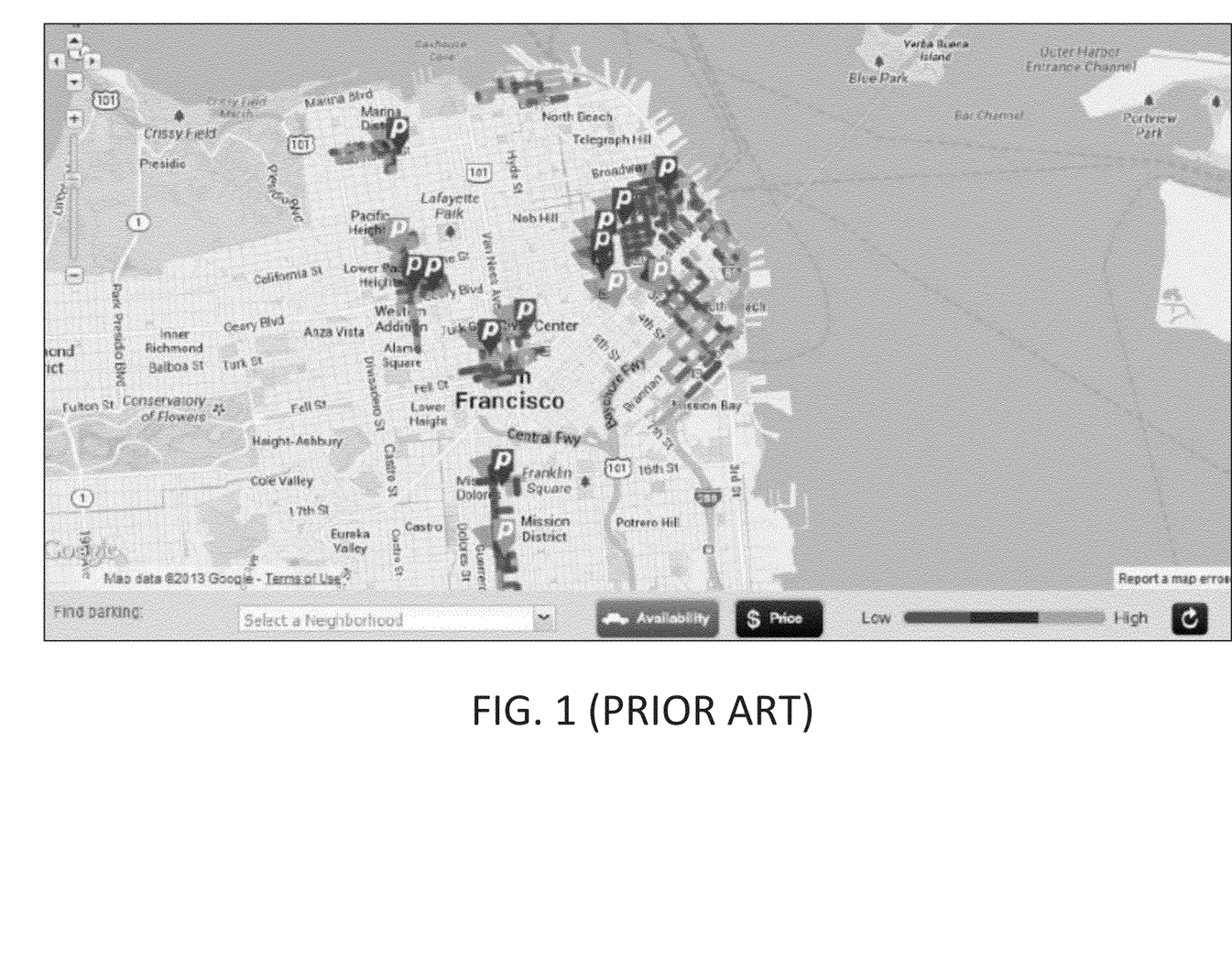
FIG. 1 is an illustration of an exemplary prior art presentation of parking availability information overlaid on a map.

A plurality of public and private agencies and companies are known in the prior art that provide access to near real time and static parking data. In general, existing systems use maps and geographical reference data to visualize the parking spot availability in certain regions. For example, as shown in FIG. 1, color and text may be overlaid on a street map to show available parking block by block on a street level. This type of visualization may be useful when searching for parking spots while the vehicle is stationary. However, it is not as useful when the driver is driving because the driver must focus on the map to find their current location on it, then abstract their direction of travel on the map, then relate that to the information of existing parking spaces. This level of focus makes using such a map-based representation of parking information difficult to use and dangerously distracting while driving.

In addition to the challenge of determining one's location and heading previously described, in the prior art parking information is made available only in an area specifically identified by a driver, and only when the vehicle's route guidance system is active. But when no area is specifically identified, and/or if the navigation system is not active for route guidance, the prior art does not enable a driver to easily obtain a sense of where available parking may be found relative to his changing location.

FIG. 1 shows an exemplary prior art vehicle navigation system display with no destination identified. As shown, a roadmap of the general area surrounding the vehicle is displayed. The vehicle's position and direction of travel may be determined, for example by a GPS module or the like. The map may be centered on the vehicle's location, and the vehicle location may be indicated on the map by a marker of some kind. From the geographic display, the driver must abstract his current position and orientation on the map, as well as the amount of available parking, and where it is relative to the vehicle's changing position and orientation while driving. It would be useful to present to a driver with information in an already abstracted form to indicate an amount of available parking nearby the vehicle's dynamically changing position, and in which direction the parking is located relative to the vehicle's dynamically changing orientation. This abstracted information can be made available without having to input a particular destination into a route guidance system, and without a route guidance system even being active. It would also be useful if the parking information could be conveyed to the driver in a manner that does not distract the driver's attention from the surrounding traffic, for example, while driving on busy streets and at intersections. Further, it would be useful to update such information and its presentation in real-time, based on the current parking situation.

In accordance with the disclosed embodiments, systems and methods may use a variety of data from a plurality of sources regarding available spaces in the vicinity of a vehicle's current location, and aggregate and present the information in an abstracted, easy to understand format for use while driving and looking for a place to park. That is, the disclosed systems and methods may facilitate making navigation decisions that are most likely to lead to available nearby parking spaces. This can be useful, for example, when deciding which way to go at an intersection, such as when the driver is simply cruising for "a nearby parking spot" and is not looking for a particular destination, independently of whether or not a route navigation system is active.

A technical challenge is to obtain information of proximate available parking spaces while driving, and aggregate and abstract the information and present the abstracted information in a format that is easy to understand by the driver at a glance, and optionally to adapt the parameters for gathering and presenting the information based on the current driving situation.

Disclosed embodiments provide a solution to the above-described technical problems by providing an in-vehicle system for obtaining information of proximate available parking spaces, and abstracting and presenting information of available parking in the current driving situation, without a driver having to provide a destination or a navigation system having to be active.

In embodiments, the system can be initiated manually, or automatically using one or more of in-vehicle sensors, driver profile information, and/or historic parking data or other mechanisms, to detect the driver's parking intent.

The disclosed system may obtain timely, such as real-time or near real-time, information of available parking spaces in close proximity to the vehicle. The information may be obtained from one or more external sources of parking information that are accessible to the vehicle via one or more wireless networks, such as cellular, wife, or satellite communications networks for example. The search radius can be adjusted manually, or automatically based on one or more parameters. The available parking information may be aggregated and abstracted to generate a visualization of the quantity, distance, and direction in relation to the position and heading of the vehicle, to available parking spaces. The visualization may be configured so that it can be understood at a glance by a driver while driving. For example, in an exemplary embodiment, instead of showing the heading and location of each available parking space overlaid on a streetmap as in the prior art, the system aggregates information of available spaces based on predetermined ranges of headings and distances from the current vehicle heading and location. Using the aggregated information, the system may generate an abstracted view that indicates the quantity and direction of nearby available parking for presentation on a display device.

Figure 2:
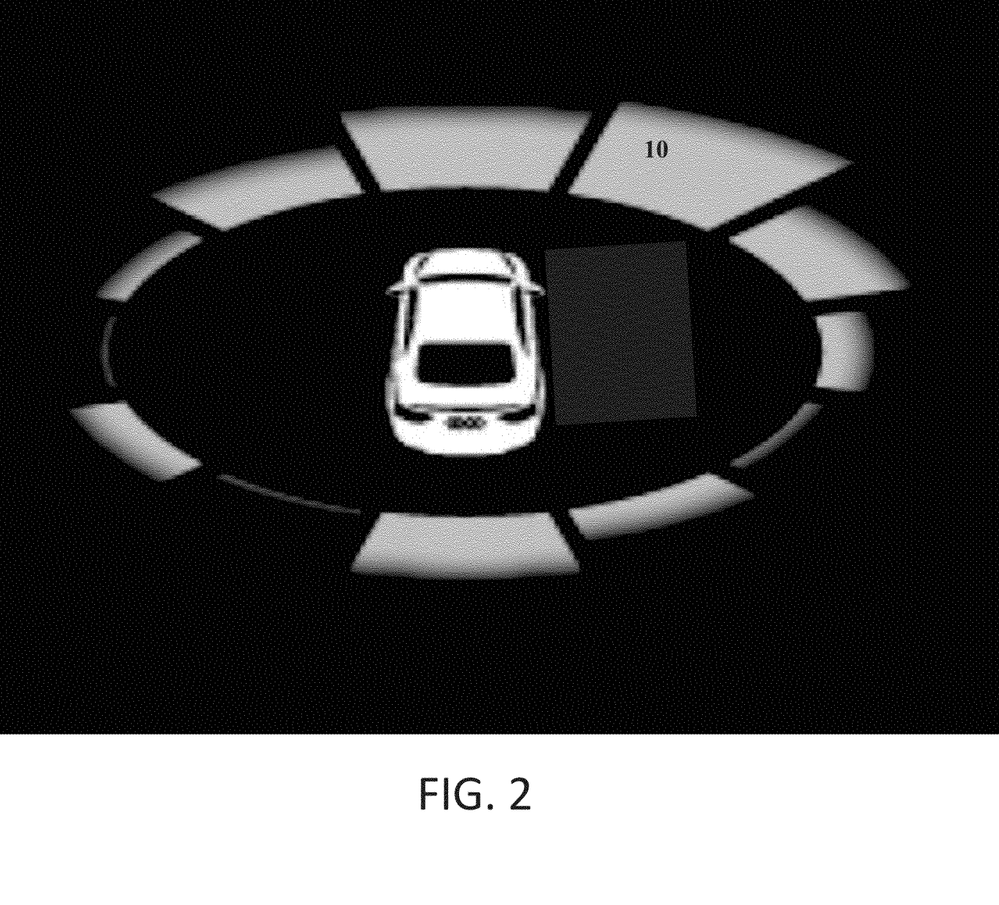
FIG. 2 shows an exemplary presentation of parking information as a "radar-like" visualization that shows at a glance where available parking may be found based on the current geographic location and orientation of a vehicle while driving and seeking a place to park nearby.

FIG. 2 shows an exemplary visualization of available parking spaces. The visualization is centered on a representation of the vehicle. The area surrounding the vehicle may be divided into a plurality of sectors. The exemplary visualization has divided the 360° surroundings of the vehicle into 12 equal sectors, although other numbers of sectors may be used, and the sectors need not all subtend the same angle. In addition, all of the sectors in FIG. 2 impliedly terminate in a circular arc with equal radii, which together form a circle centered on the vehicle's position. However, the arc radii need not be equal, and other sector boundaries may be used, such as straight lines connecting points equidistant from the vehicle along borders of adjacent sectors.

In FIG. 2, the general direction of available parking spaces in each of the sectors is represented by the position of the bars relative to the central vehicle indicator, and the quantity of the available parking spaces in that general direction is indicated by the "depth" or "height" of the bars. In FIG. 2, the visualization indicates that there are more available parking spaces directly ahead, and slightly to the left, and slightly to the right. This information may be useful, for example, when deciding at an intersection whether to turn left or right, go straight, or even go around the block and head in the opposite direction. In the illustration, the driver would most likely elect to continue straight through the intersection.

The exact number of parking spots in a specific area may not be of interest at the moment such a decision is made, but only the general direction in which the driver is most likely to find a nearby parking spot. However, in an embodiment, the sector containing the most available spaces may show the number of spaces in that sector, as is shown in FIG. 2, where 10 spaces are shown as available in the sector ahead and to the right. Alternatively, a selection of the sectors, or all of the sectors, may show the number of available spaces in the respective sectors.

The visualization may be created based on real-time information about the vehicle's position, obtained for example from a GPS module or by triangulation from known positions of wireless communication access points, and heading data obtained for example using the position information or from a magnetic compass, as well as near real-time parking data in the surrounding area obtained wirelessly from one or more sources of parking availability information. The area surrounding and centered on the vehicle may be divided into a plurality of sectors. The total number of available spaces located in each of the sectors and the distance of each of the available spaces is then determined. A graphical abstraction representing the quantity and distance to the available spaces in each sector may be generated based on the number of available parking spaces in each sector and each space's distance from the vehicle's current position. These results are aggregated for each sector, and all sectors are normalized based on the sector having the greatest weight. The normalized results may then be presented to the driver on a display device and updated dynamically as the vehicle moves and as updated parking information is received.

Thus, the prior art provides a geo-spatial or map-based presentation of available parking spots, or blocks where available parking spaces may be found. Such a presentation is of limited use while driving because it demands that the driver focus his/her attention away from the road ahead for significant periods of time in order to view the presented information and to be updated with new conditions while driving, and relate this information to the driver's current location and heading. Accordingly, it is dangerous to use prior art presentations of parking availability while driving.

In contrast, the disclosed apparatus, systems, and methods present an abstracted heading-based representation of proximate available parking spaces that can be understood at a glance, and is particularly useful to assist a driver in the context of a moving vehicle while driving. The presented information may be dynamically updated, abstracted, and presented based on a vehicle's changing location, and show only information most immediately relevant to making a driving decision when actively seeking an available parking space.

Another exemplary visualization (not shown) may use non-concentric circles that may be weighted to indicate higher parking availability. Such circles may be generated, for example, by dividing the surrounding area into a plurality of identical regular polygons, such as squares, rectangles, triangles, hexagons, or the like. The available spaces in each polygon may be counted and represented by a circle centered in the respective polygonal area, and normalized to the circle that represents the most available spaces. In embodiments, the circle representing the most available spaces can have displayed therein the number of available spaces in the corresponding polygon, or a selection of the circles, or all of the circles, can be displayed in conjunction therewith the respective number of available spaces in the respective polygons.

Another exemplary visualization (not shown) may use one or more grayscale or color coded circles or rings around the vehicle indicator, or a varying density of dots around the vehicle indicator, that may correlate to nearby available parking spaces, and the like.

In at least one embodiment, the system can identify and keep track of locations of parking spaces used over time, and use such information to initiate the parking system based on a user previously parking in an area. Moreover, in at least one embodiment, the parking system can be arranged to dynamically adapt parameters of the presented information based on the current driving situation. For example, slowing down in a downtown area within a predetermined window of time and in an area where a driver has parked previously may be used to trigger initiation of the system. Furthermore, the size of the area to examine to find available parking may be adjusted based on the vehicle's speed, and/or the number of sectors or polygons to divide the surrounding area into. For example, when approaching a downtown area and decelerating from a highway speed, such as would occur on an off-ramp, the system could divide the surrounding area into four sectors: front, back, left, and right; and count, abstract, and display the available spaces within a half mile radius of the vehicle. When further slowing to a predetermined "browsing for parking" speed, such as 8 mph+/−2 mph for example, the system can divide the surrounding area into 12 sectors, with a radius of a quarter mile, for example, and modify the display accordingly. Alternatively or in addition, the condition of the driver may be detected by sensors, and that information may be used to modify or adapt the selection and display of proximate available parking spaces. For example, spoken words, gestures, and the like may be used to control how the system obtains and presents parking information.

Figure 3:
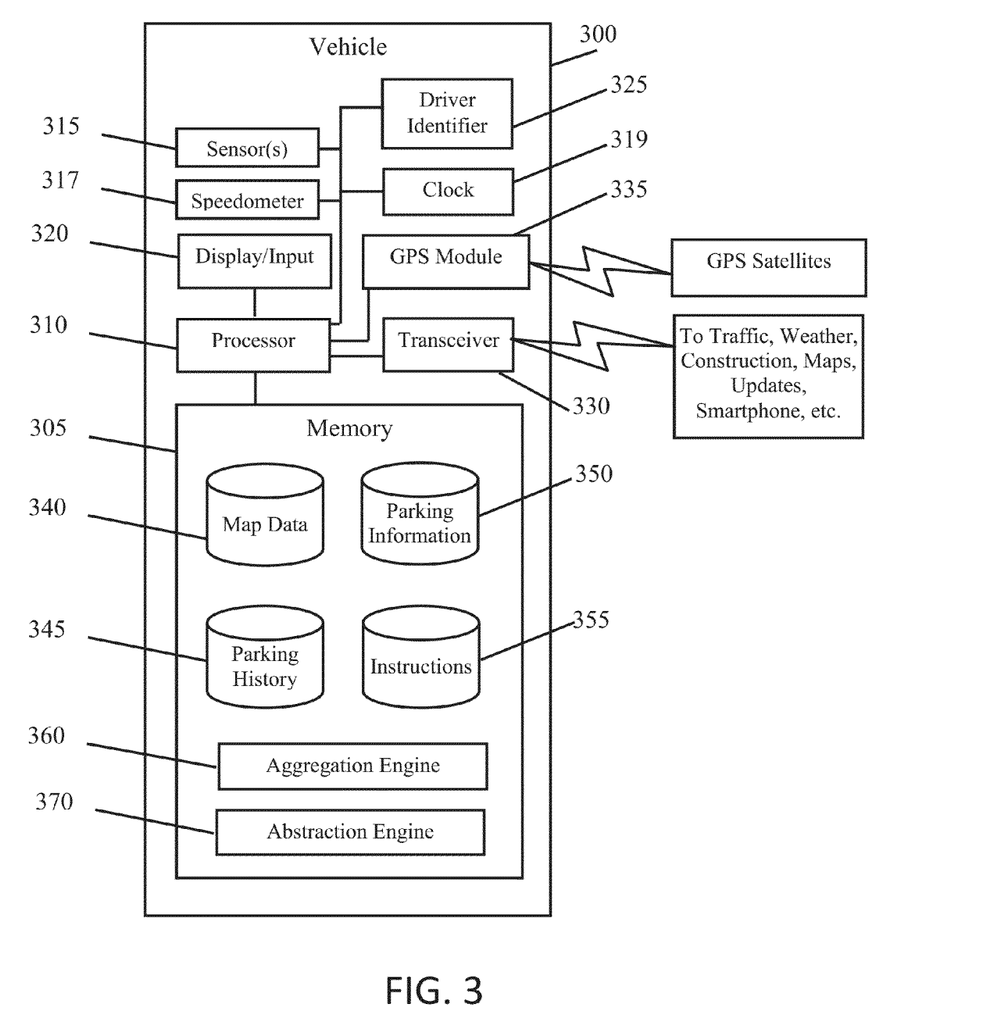
FIG. 3 is a simplified block diagram of an exemplary system for presenting proximate available parking information, in accordance with the disclosure.

FIG. 3 is a simplified block diagram of a vehicle system 300 for presenting information of proximate available parking spaces to the driver of a vehicle, and for dynamically updating the presentation as conditions change. System 300 is controlled primarily by computer readable instructions, which may be in the form of software instructions stored on a tangible data storage device 305 (hereinafter "memory"), such as a magnetic disk hard drive, solid state drive, optical disk, and/or high-speed read only memory (ROM), random access memory (RAM) or the like. In an embodiment, RAM may temporarily store instructions and data retrieved from slower storage devices as needed for current operations, from which they can be more quickly read and processed by the processor or other hardware devices.

The instructions may be executed by a tangible processor 310, such as a microprocessor, to cause system 300 to perform tasks. In operation, processor 310 fetches and executes instructions and information, and generates and transfers information to and from other resources coupled to or in data communication with the processor.

In addition, system 300 may contain one or more sensors 315, such as a motion sensor and/or camera arranged to detect driver movements, hand gestures, and the like, and/or one or more microphones to detect verbalizations and other sounds from the driver. An accessible speedometer 317 provides vehicle speed information. A clock 319 may be included for determining time-based information, such as a time of day, a duration, a day of the week, etc. System 300 also contains display device 320 to present visual output generated by the processor or a display controller. Such output may include a vehicle position indicator, and information of proximate available parking spaces, aggregated, abstracted, and presented in a format that may be understood at a glance. Display 320 may be implemented with an LCD-based touch sensitive flat-panel display operable to receive input such as driver selections, text on a virtual keyboard, or the like. Alternative or additional input and output devices may also be included, such as a microphone and speech recognition software for receiving verbal input, a speaker and speech producing software for providing output, and the like.

System 300 may include a transceiver module 330 operative to obtain information from one or more remote sources, such as one or more servers on a wirelessly accessed network. The transceiver module may include, for example, a cellular transceiver in data communication with a cellular, wifi, or satellite communication system or the like (not shown). In addition, the transceiver module may be operative to establish a Blue Tooth, WIFI, near-field, or other data communication connection with the driver's smartphone (not shown) or the like. A GPS module 335 may be included in or be accessible to the system 300 that is operable to determine a geographic position of the vehicle, such as by communicating with a plurality of GPS satellites and triangulating the vehicle's location based on the satellites' positions. Alternatively or in addition, the system 300 may determine its geographic position by triangulation based on the known locations of cellular or WIFI access points, or other known reference points. The system 300 may also include or have access to stored roadmap data 340. Further, the system 300 may be operable to correlate the vehicle position from GPS module 335 with the map data to determine the location of available parking spaces relative to the vehicle's position while driving.

Memory 305 may include one or more databases for storing information. In embodiments, the stored information may include map data, 340, parking history and/or driver information 345, received proximate available parking information 350, and instructions 355 for performing tasks, as described herein. In an embodiment, certain instructions when executed on the processor, in combination with other information such as information stored in the memory, or obtained from one or more of the devices coupled to the processor, or the like, may implement parking information aggregation engine 360, and abstraction and presentation engine 370.

Parking information aggregation engine 360 may be operative to obtain and aggregate information of proximate available parking spaces while driving. To do so, engine 360 divides a representation of the surrounding area into a plurality of sub-areas that move with the vehicle. The sub-areas may be a plurality of sectors, each extending from the vehicle's location for a distance that is the radius of a circular arc that defines the outer boundary of the respective sector. Alternatively, the sub-areas may divide the surrounding area into a plurality of other types of sub-areas, such as a plurality of regular polygons such as triangles, rectangles, or hexagons, for example. Aggregation engine 360 may then determine which sub-area each available parking space is located in and count the number of available parking spaces in each sub-area.

In at least one embodiment, the aggregation engine 360 may also determine the distance from the vehicle to each of the counted parking spaces. The system 300 may also assign a weight to each space according to its distance. For example, each space may be given a weight directly or exponentially inversely proportional to its distance from the vehicle, thereby more heavily weighting spaces that are close to the vehicle. The aggregation engine 360 may then calculate a weight to be assigned to each of the sub-areas. The weight assigned to a sub-area may be the number of available spaces in the sub-area, or may be the sum of the weights assigned to each available space in the sub-area, for example.

Abstraction and presentation engine 370 may abstract the per sub-area weighted parking availability information into a format that can be understood at a glance, and presents the abstracted information on a display device in the vehicle. For example, engine 370 may present information representative of the number of spaces available in each sub-area, without regard for the distance of the spaces from the vehicle. Alternatively, the presented information may also account for the respective distances of the spaces.

In at least one embodiment, data of parking events may be collected for use in determining when to automatically initiate the system 300. For example, the system 300 may monitor where the vehicle is parked, using data from GPS module 335, for example. By correlating GPS data obtained when the vehicle is parked with map data, common destinations may be identified and stored. Identified destination information may then be used by the system 300 to initiate the system 300 when approaching a common destination.

In an embodiment, system 300 may include a driver identifier 325 for identifying the driver. The identifier may be or include a key fob or key containing electronics that have been identified in the system 300 with a particular driver, a camera and face recognition software, a driver position setting control that identifies a select collection of settings with a driver, or the like. The driver identifier may be used to personalize aspects of the information presented on the display to one or more specifically identified drivers. The system 300 may also gather, store, and analyze parking data of each driver's parking events.

In embodiments, system 300 may be included in a vehicle as original equipment, or may be included in or coupled to a vehicle's infotainment head unit (HU). Alternatively, system 300 may be embodied in a personal computing platform such as a smart phone or the like. Such a personal computing platform may operate independently of any vehicle-based system, and/or may be coupled to a vehicle-based system or HU by a wired or wireless connection, such as via a wired docking cradle, or a wireless Bluetooth, WiFi, or nearfield communications (NFC) connection.

Figure 4:
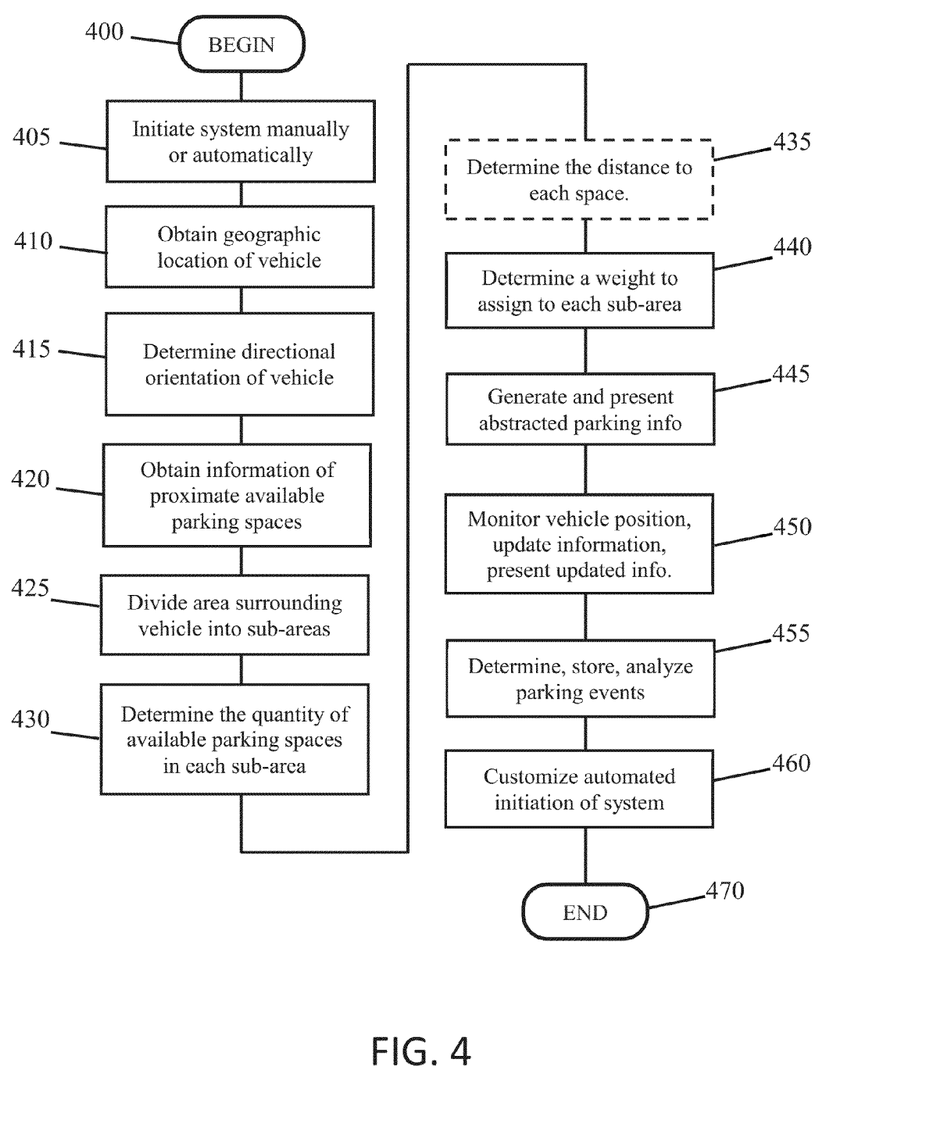
FIG. 4 is a block diagram of a method for presenting proximate available parking information, such as might be performed using the system of FIG. 3, in accordance with the disclosure.

FIG. 4 is a flow diagram of an exemplary method for presenting information of proximate available parking spaces while driving. The method begins, 400, when the system is launched. The system may be initiated manually or automatically, such as when approaching a common destination, 405. The system obtains a geographic location of the vehicle, 410. The location may be obtained, 410, for example, from a GPS module, although other location indicating systems may be used, such as triangulation based on cellular towers if a cellular radio is available to the system, or wifi access points is a wifi radio is available, or the like. At 415, the orientation of the vehicle is determined, for example using consecutive location points, or using a compass or other direction sensing device. The speed of the vehicle may also be obtained, such as from a speedometer of the vehicle, or estimated using consecutive location points and the time elapsed between them. At 420, the system obtains information of proximate available parking spaces.

The system divides the area surrounding the vehicle into sub-areas, 425, and determines the number of available parking spaces in each sub-area, 430. Optionally, the system determines the distance to each space, 435. The dashed border around step 435 indicates step 435 is optional in some embodiments. The system determines a weight to assign to each sub-area, 440. The system then generates an abstracted representation of the available parking information in a format that can be understood at a glance while driving, 445.

As the vehicle moves, and as the available parking information changes, for example as new spaces open up or existing spaces are filled, the display is refreshed continuously or intermittently with updated timely information, 450. As the vehicle changes directions, such as by turning onto a different roadway or the like, the system detects the changed heading, and refreshes the display accordingly.

In embodiments, the system may obtain additional information, and may modify the display of available parking information. For example, a search radius and/or configuration of surrounding area sub-units may be adjusted based on a vehicle's current speed. In an embodiment, the search radius may be automatically reduced if the vehicle's speed slows to a point deemed by the system to indicate that the driver may be cruising for a place to park.

In addition, the system may be initiated based on input from one or more sensors operative to obtain a driver's current state. For example, the detection by a motion sensor of a plurality of short, quick head movements may be deemed to be indicative of driver looking for a parking space. In addition or alternatively, sensors may be arranged to recognize hand gestures, and initiate or modify aspects of the system based on the gestures.

Returning now to FIG. 4, in an exemplary embodiment the system may autonomously and automatically determine, store, and analyze a plurality of parking events over time, 455. The system may then automatically customize the initiation of the system based at least in part on the prior parking events, 460. The method may end, 470, when the system detects a maneuver characteristic of parking, such as stopping, reversing while turning the steering wheel hard, and stopping; or when the vehicle is turned off, for example.

In an embodiment, a driver may input preferences for specific features of a preferred presentation of parking information. For example, the driver may prefer a certain radius to be searched for available parking, or a certain preferred presentation of the abstracted information, and/or a preferred modification of the presentation under certain identified conditions. Moreover, the driver may indicate a preference for one or more classes of parking spaces, such as weighting or indicating slot parking differently than parallel parking, or free parking versus metered parking, or metered parking having a longer available duration when paying the meter, for example. The system may store those preferences and search for such features in remotely stored databases to indicate preferred parking on a display, for example.

Figure 5:
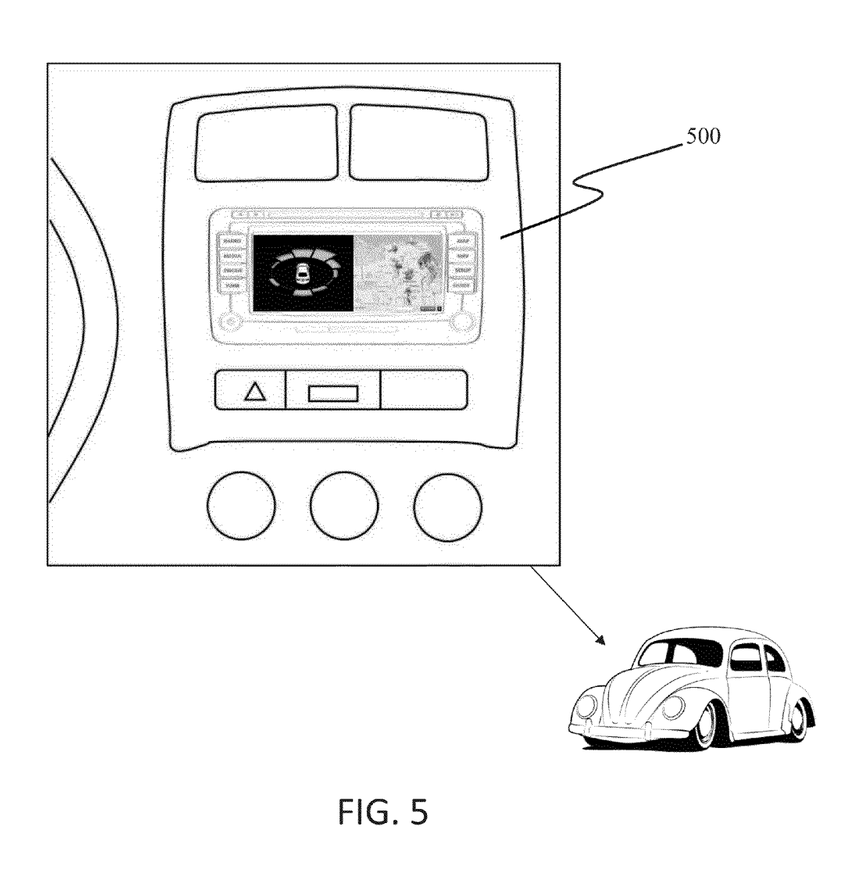
FIG. 5 illustrates an exemplary embodiment of the disclosed system in a head unit of a vehicle.
Figure 6:
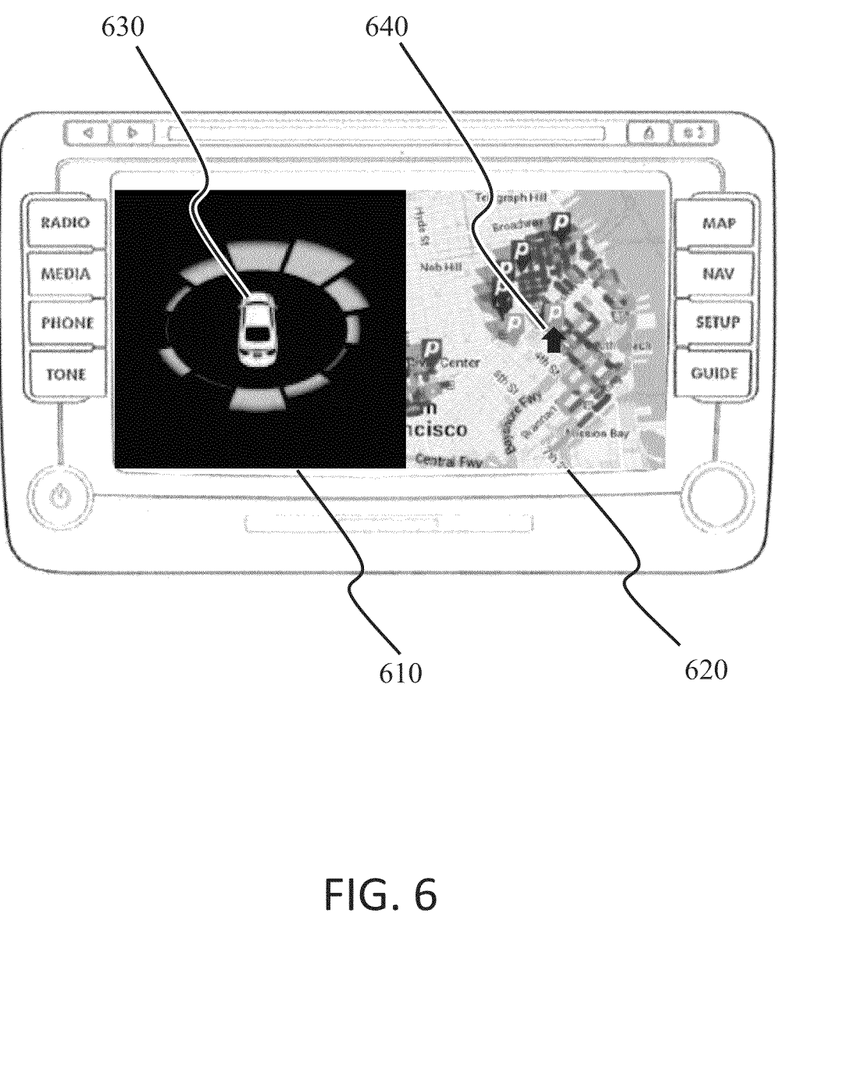
FIG. 6 is a detailed view of an exemplary display of the embodiment of FIG. 5, from which at a glance navigation decisions can be made that should lead to proximate available parking spaces, similar to that shown in FIG. 5.

FIG. 5 illustrates an exemplary embodiment of an in-vehicle display, 500, of the system, and FIG. 6 is a close up view of the display of FIG. 5. In the illustration, abstracted parking information 610 is presented in conjunction with a prior art presentation of parking information, 620, although other formats may also be used, for example showing the abstracted parking information alone. As shown, the abstracted parking information contains a vehicle indicator, 630, and the prior art presentation also contains a corresponding vehicle indicator, 640.

In embodiments, audio, visual, and/or tactile elements may be accessible to or included in and/or used by the system to communicate information to or from the driver. As noted, the system may use one or more sensors, such as motion sensors, microphones, cameras, and the like, to obtain driver information, which may be used to infer a driver's parking intent. Such information may be used by the system to modify the parking information abstraction displayed or to otherwise modify the display accordingly, e.g., by selecting different sub-areas, increasing or decreasing the search radius, and the like.

Advantages of the herein disclosed apparatus, systems, and methods include the presentation of abstracted information of proximate available parking spaces, updated in real-time or near real-time, in a format that can be understood at a glance by a driver cruising for a place to park. Such a display is particularly useful for making navigation decisions at intersections. In contrast, in the prior art a driver must focus on analogous information overlaid on a map and correlate that information with the vehicle's dynamically moving location. This is impossible to do at a glance, but requires prolonged focus on the display. Accordingly, attempting to do so while driving can be dangerous. In the broadest terms, the system can make use of virtually any external and wirelessly accessible source of available proximate parking information, and abstract and format the information for display on virtually any display available for viewing by the driver, with or without route guidance being active or even available.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for presenting information of available parking spaces proximate the vehicle, comprising:
   a processor in data communication with:
      a graphical display device operative to present a graphical abstracted visualization of available parking spaces proximate the vehicle, including an indication of a quantity of available spaces and their general heading and distance relative to a current orientation and position of the vehicle;
      a transceiver operative to communicate with at least one source of available parking information;
      a global positioning system (GPS) module operative to determine a geographic location of the vehicle; and
      a non-transitory data storage device on which is stored computer code which, when executed on the processor, implements:
   a database that stores information of available parking spaces obtained from the transceiver; and
   instructions which, when executed on the processor, cause the system to:
      obtain a geographic location of the vehicle from the GPS module;
      determine an orientation of the vehicle;
      identify available parking spaces proximate the vehicle based on the vehicle location;
      determine an estimated distance and heading to each of the select parking spaces from the current vehicle location and orientation;
      present on the display an abstracted graphical visualization indicative of the general amount and general direction of the available parking spaces proximate the vehicle for use by a driver while driving to determine which direction is most likely to lead to available parking spaces; and
      dynamically obtain updated information of available proximate parking spaces and refresh the display with the updated information; and means for generating the abstracted graphical visualization indicative of the proximate available parking spaces;
wherein the abstracted graphical visualization is independent of geo-spatial and location visualizations.

2. The system of claim 1, wherein the abstracted visualization provides a 360 degree representation of proximate available parking in a plurality of predetermined sectors.

3. The system of claim 2, wherein the abstracted visualization provides an aggregate representation of the distance and quantity of the proximate available parking spaces in each of the predetermined sectors.

4. The system of claim 1, wherein the system is initiated manually, or is initiated automatically using at least one of an in-vehicle sensor and historic vehicle parking data, to detect the parking intent of the driver.

5. An in-vehicle system for presenting information of available parking spaces proximate the vehicle, comprising:
a processor in data communication with:
a graphical display device operative to present a graphical abstracted visualization of available parking spaces proximate the vehicle, including an indication of a quantity of available spaces and their general heading relative to a current position and orientation of the vehicle;
a transceiver operative to communicate with at least one source of available parking information;
a global positioning system (GPS) module operative to determine a geographic location of the vehicle; and
a non-transitory data storage device on which is stored computer code which, when executed on the processor, cause the system to:
obtain a geographic position of the vehicle from the GPS module;
determine an orientation of the vehicle;
identify available parking spaces proximate the vehicle based on the position of the vehicle and parking space information received via the transceiver;
determine an estimated heading to each of the select parking spaces from the current vehicle location and orientation;
aggregate the information of proximate available parking spaces;
generate an abstracted graphical visualization of the aggregated information of available parking spaces that conveys their quantity and heading from the vehicle's current location and orientation; and
present on the display the abstracted graphical visualization, and
further comprising a clock that provides time-based information, wherein the time-based information is used to detect the parking intent of the driver.

6. The system of claim 5, further comprising:
computer code stored on the non-transitory data storage device which, when executed on the processor, implements:
a database that stores the information of available parking spaces obtained from the transceiver;
a parking information aggregation engine that obtains information of proximate available parking spaces while driving; and
an abstraction and presentation engine that abstracts the aggregated information of proximate available parking spaces and presents the abstracted information on the display in a format that is understandable at a glance as the abstracted graphical visualization.

7. The system of claim 5, wherein the instructions executed on the processor further cause the system to continuously or periodically refresh the display with updated information.

8. The system of claim 5, wherein the abstracted visualization provides a 360 degree representation of proximate available parking in a plurality of predetermined sub-areas.

9. The system of claim 8, wherein the sub-areas are sectors.

10. The system of claim 8, wherein the sub-areas are regular polygons.

11. The system of claim 5, wherein the visualization system is triggered manually.

12. The system of claim 5, further comprising an input for the driver to enter driver preference information, wherein the driver preference information is used to generate a preferred abstracted graphical visualization of proximate available parking spaces.

13. The system of claim 6, wherein the stored code further implements a parking history database for determining the location of a parking space in which the vehicle has been parked, and storing in the database the location of the parked-in space.

14. The system of claim 13, wherein the database stores information of a plurality of parking spaces previously parked in, and uses the stored parking information to automatically initiate the system.

15. The system of claim 6, wherein the parking information aggregation engine modifies the collection and aggregation of information of proximate available parking spaces based on driving conditions.

16. The system of claim 15, wherein the modifying is based on a speed of the vehicle.

17. The system of claim 5, further comprising at least one sensor operative to detect an action of the driver, wherein the system is initiated automatically based on the detected action.

18. The system of claim 17, wherein the action is a gesture.

19. The system of claim 17, wherein the action is a verbal command.

20. The system of claim 13, wherein the historic parking information is used to detect the parking intent of the driver.

21. A vehicle that includes the system of claim 5.

22. A method for use by an in-vehicle system for presenting to a driver of a vehicle information of available parking spaces proximate the vehicle, comprising:
obtaining a geographic position of the vehicle from a GPS module;
determining an orientation of the vehicle;
obtaining information of currently available parking spaces proximate the vehicle from a transceiver and storing the information in a non-transitory data storage device;
dividing the area surrounding vehicle into sub-areas;
aggregating a quantity of currently available parking spaces in each sub-area;
determining a weight to assign to each sub-area based on the quantity of available parking spaces therein;
generating an abstracted graphical visualization of the currently available parking spaces that conveys their aggregated quantity and heading from the vehicle's current location and orientation; and
presenting on a display the abstracted graphical visualization wherein the method further comprising determining the location of a parking space in which the vehicle has been parked and storing information of the parked-in space in a database and
wherein the stored parking information is used to initiate the in-vehicle system.

23. The method of claim 22, further comprising monitoring the vehicle's position and orientation, and continuously or intermittently updating the presentation of the abstracted graphical visualization based on changes in the vehicle's position or orientation.

24. The method of claim 22, wherein the abstracted visualization provides a 360 degree representation of select available parking in a plurality of predetermined sectors.

25. The method of claim 22, wherein the method is triggered manually, or is triggered automatically using at least one of an in-vehicle sensor and historic parking data, to detect the parking intent of the driver.

26. The method of claim 22, further comprising entering driver preference information by a driver, wherein the driver preference information is used in the generation of the abstracted visualization of available parking spaces.

27. The method of claim 22, wherein the database stores information of a plurality of parking spaces previously parked in, and the stored parking information is used to determine the driver's parking intent.

28. The method of claim 22, further comprising detecting an action of the driver, wherein the system is initiated automatically based on the detected action.

29. The method of claim 28, wherein the action is a gesture detected by a sensor.

30. The method of claim 28, wherein the action is a verbal statement detected by a sensor.

31. The method of claim 28, wherein the action is an inputting of preference information into the system by the driver.

32. The method of claim 22, wherein a time of day is used to detect a driver's parking intent.

* * * * *